United States Patent
Rao et al.

(10) Patent No.: US 7,526,305 B2
(45) Date of Patent: *Apr. 28, 2009

(54) PUSH-TO-TALK HANDLING IN A DUAL PROCESSOR ENVIRONMENT

(75) Inventors: Krishna Rao, Kanata (CA); Arun Munje, Kanata (CA); Xiaona An, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/745,935

(22) Filed: May 8, 2007

(65) Prior Publication Data

US 2007/0238479 A1    Oct. 11, 2007

Related U.S. Application Data

(63) Continuation of application No. 10/728,189, filed on Dec. 3, 2003, now Pat. No. 7,231,225.

(51) Int. Cl.
*H04B 7/00* (2006.01)
*H04Q 7/20* (2006.01)

(52) U.S. Cl. .................. 455/517; 455/550.1; 455/502; 455/552.1

(58) Field of Classification Search .............. 455/550.1, 455/517, 502, 552.1, 518, 519, 90.1–3, 509, 455/515, 516, 575.1, 464, 67.11, 520
See application file for complete search history.

(56) References Cited

U.S. PATENT DOCUMENTS 4,328,581 A * 5/1982 Harmon et al. ............... 455/62
6,522,894 B1 * 2/2003 Schmidt ................... 455/552.1
6,871,144 B1 * 3/2005 Lee ............................ 455/456.1
2006/0114314 A1 * 6/2006 Dunko ........................ 348/14.1

OTHER PUBLICATIONS

Product Information Sheet: *Remote Control*, 3 pages, www.my-symbian.com/uiq/applications/applications.php?faq=6&fldAuto=8; © 2001 My-Sybian.com.
Product Information Sheet: *Remote P800—Remote P900*, 3 pages, www.my-symbian.com/uiq/applications/applications.php?faq=2 &fldAuto=248; © 2001 My-Sybian.com.

* cited by examiner

*Primary Examiner*—John J Lee
(74) *Attorney, Agent, or Firm*—Allen, Dyer, Doppelt, Milbrath & Gilchrist, P.A.

(57) ABSTRACT

In a push-to-talk device having two processors where one of the processors is a radio chip and one of the processors is a microprocessor, a method and apparatus for synchronizing the microprocessor and the radio chip includes the steps of checking the status of a radio push-to-talk key on the radio chip when a user push-to-talk button is turned on or off on the microprocessor; if the user push-to-talk button is on and the radio push-to-talk key is off, performing the steps of sending a command to the radio chip to turn on the radio push-to-talk key; and waiting for a response from the radio chip, and if the response indicates the radio push-to-talk key is on, remaining in this synchronized state, otherwise repeating the sending and waiting steps; if the user button is off and the radio push-to-talk key is on, performing the steps of sending a command to the radio chip to turn off the radio push-to-talk key; and waiting for a response from the radio chip, and if the response indicates the radio push-to-talk key is off, remaining in this synchronized state, otherwise repeating the sending and waiting steps; if the user push-to-talk button is off and the radio push-to-talk key is off, remaining in this synchronized state; and if the user push-to-talk button is on and the radio push-to-talk key is on, remaining in this synchronized state.

19 Claims, 2 Drawing Sheets

PUSH-TO-TALK HANDLING IN A DUAL PROCESSOR ENVIRONMENT

CROSS-REFERENCE TO RELATED APPLICATIONS

This application is a continuation of Ser. No. 10/728,189 filed Dec. 3, 2003 now U.S. Pat No. 7,231,225, the entire disclosure of which is hereby incorporated herein by reference.

FIELD OF THE INVENTION

The present invention relates to push-to-talk capabilities in a dual processor wireless device, and more specifically to a method of synchronizing the dual processors for push-to-talk handling in a dual processor wireless device.

BACKGROUND OF THE INVENTION

A push-to-talk device is a device capable of participating in a Direct Conned" or Walkie-Talkie phone call. The device works by having a user push a button to transmit and release the button to receive signal transmitted by other user(s).

In a device with two processors, one processor is used as a radio chip and has an RF interface and a radio push-to-talk key for originating or participating in a Direct Connect™ or Walkie-Talkie phone call.

The second processor is a control chip. This chip has access to the button used for the push-to-talk capability that is the user interface for the device.

The radio chip and the controller chip are linked to communicate using a protocol command/response. Every push-to-talk button press or release on the controller chip must be relayed to the radio chip using a protocol command and the controller chip must wait for a response from the radio chip. This leads to synchronization problems due to protocol round trip delays, changes in the user's choice while waiting for a response, or the radio chip rejecting the command from the controller chip for various reasons. These problems are common in dual processor equipped devices with push-to-talk capabilities.

SUMMARY OF THE INVENTION

The present invention overcomes the deficiencies in the prior art by providing a method for synchronizing the two processors in a dual processor equipped wireless device with a push-to-talk functionality. The method ensures both the controller and the radio chip are synchronized by checking the status of the radio chip on the activation or deactivation of the user button. The state of the radio chip should correspond with the state of the user button and, if it does not, a command is sent to the radio chip to turn on or turn off the radio push-to-talk key to ensure the key is in the same state as the controller chip. Once the radio chip and the controller chip become synchronized, the method of the present invention includes steps for returning the device to a synchronized state if the chips become unsynchronized.

The present invention therefore provides, in a push-to-talk device having two processors where one of the processors is a radio chip and one of the processors is a controller chip, a method of synchronizing the controller chip and the radio chip comprising the steps of checking the status of a radio push-to-talk key on the radio chip when a user button is turned on or off on the controller chip; if the user button is on and the radio push-to-talk key is off, performing the steps of sending a command to the radio chip to turn on the radio push-to-talk key; and waiting for a response from the radio chip, and if the response indicates the radio push-to-talk key is on, remaining in this synchronized state, otherwise repeating the sending and waiting steps; if the user button is off and the radio push-to-talk key is on, performing the steps of sending a command to the radio chip to turn off the radio push-to-talk key; and waiting for a response from the radio chip, and if the response indicates the radio push-to-talk key is off, remaining in this synchronized state, otherwise repeating the sending and waiting steps; if the user button is off and the radio push-to-talk key is off, remaining in this synchronized state; and if the user button is on and the radio push-to-talk key is on, remaining in this synchronized state.

BRIEF DESCRIPTION OF THE DRAWINGS

The method of the present invention will be better understood with reference to the drawings, in which.

DETAILED DESCRIPTION OF THE PREFERRED EMBODIMENTS

Figure 1:
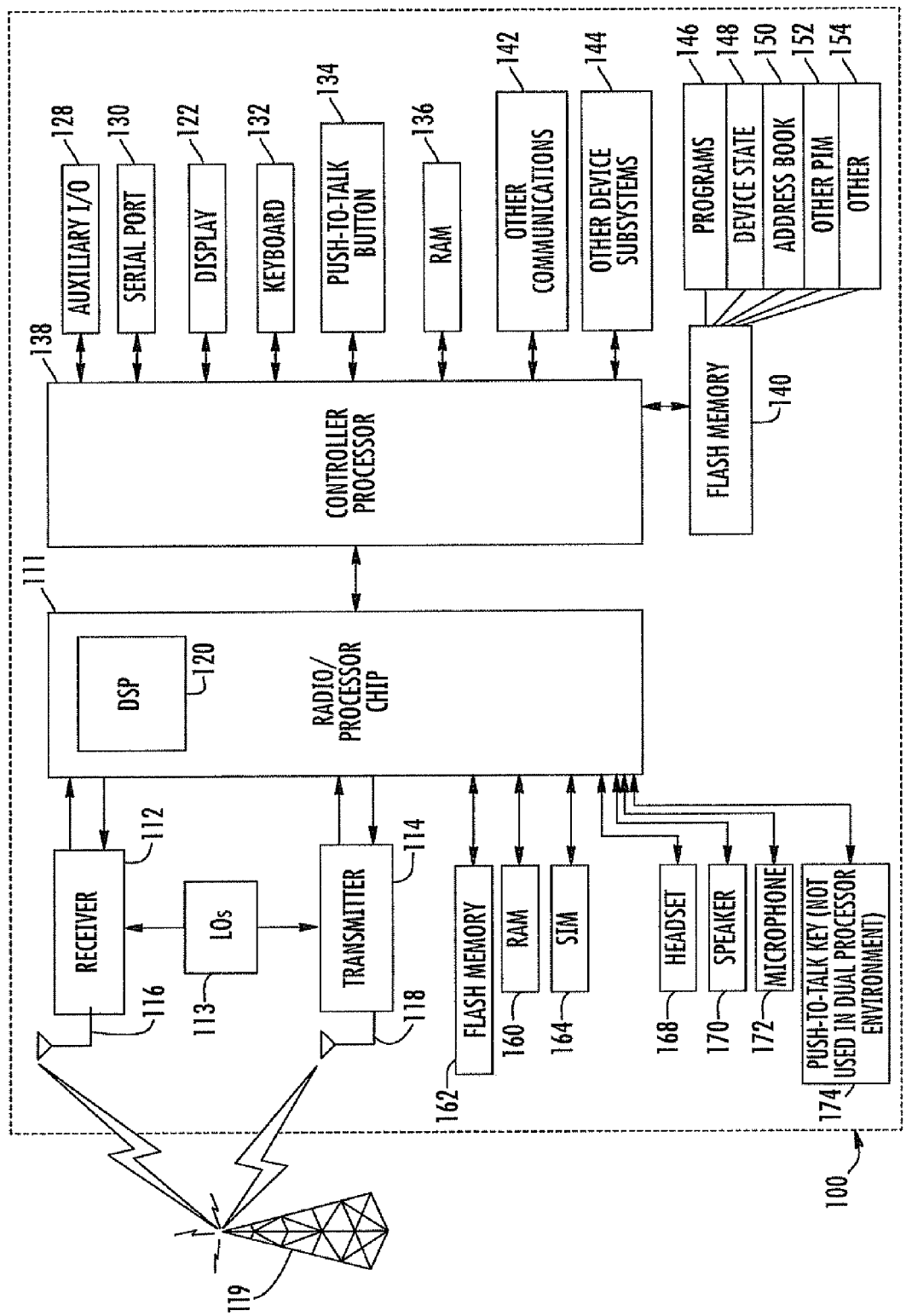
FIG. 1 is block diagram illustrating a mobile station including preferred embodiments of the apparatus and method of the current application.

Referring to the drawings, FIG. 1 is a block diagram illustrating a mobile station including preferred embodiments of the apparatus and method of the current application. Mobile station 100 is preferably a two-way wireless communication device.

Mobile station 100 incorporates a communication subsystem having both a receiver 112 and a transmitter 114, as well as associated components such as one or more, preferably embedded or internal, antenna elements 116 and 118, local oscillators (1-0s) 113, and a processing module such as a digital signal processor (DSP) 120.

As will be apparent to those skilled in the field of communications, the particular design of the communication subsystem will be dependent upon the communication network in which the device is intended to operate.

When required network registration or activation procedures have been completed, mobile station 100 may send and receive communication signals over the network 119. Signals received by antenna 116 through communication network 119 are input to receiver 112, which may perform such common receiver functions such as signal amplification, frequency down conversion, filtering, channel selection and the like, and in the example system shown in FIG. 1, analog to digital (AID) conversion. AID conversion of a received signal allows more complex communication functions such as demodulation and decoding to be performed in the DSP 120.

In a similar manner, signals to be transmitted are processed, including modulation and encoding for example, by DSP 120 and input to transmitter 114 for digital to analog conversion, frequency up conversion, filtering, amplification and transmission over the communication network 119 via antenna 118. DSP 120 not only processes communication signals, but also provides for receiver and transmitter control. For example, the gains applied to communication signals in receiver 112 and transmitter 114 may be adaptively controlled through automatic gain control algorithms implemented in DSP 120.

Mobile station 100 preferably includes a radio processor/chip 111 and a microprocessor 138 which together control the overall operation of the device. DSP 120 is located on radio chip 111. Communication functions are performed through radio chip 111.

Radio Chip 111 interacts with receiver 112 and transmitter 114, and further with flash memory 162, random access memory (RAM) 160, the subscriber identity module 164, a headset 168, a speaker 170, a microphone 172 and a push-to talk key 174.

Microprocessor 138 interacts with further device subsystems such as the display 122, flash memory 140, random access memory (RAM) 136, auxiliary input/output (I/O) subsystems 128, serial port 130, keyboard 132, push to talk button 134, other communications 142 and other device subsystems generally designated as 144.

Some of the subsystems shown in FIG. 1 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list.

Software used by radio chip 111 and microprocessor 138 is preferably stored in a persistent store such as flash memory 140 and 162, which may instead be a read-only memory (ROM) or similar storage element (not shown). Those skilled in the art will appreciate that the operating system, specific device applications, or parts thereof, may be temporarily loaded into a volatile memory such as RAM 136 and RAM 160. Received communication signals may also be stored in RAM 136.

As shown, flash memory 140 can be segregated into different areas for computer programs 146, device state 148, address book 150, other personal information management (PIM) 152 and other functionality generally designated as 154. These different storage types indicate that each program can allocate a portion of flash memory 140 for their own data storage requirements. Microprocessor 138, in addition to its operating system functions, preferably enables execution of software applications on the mobile station.

For voice communications, overall operation of mobile station 100 is similar, except that received signals would preferably be output to a speaker 170 or headset 168 and signals for transmission would be generated by a microphone 172. Alternative voice or audio I/O subsystems, such as a voice message recording subsystem, may also be implemented on mobile station 100.

Serial port 130 in FIG. 1, would normally be, implemented in a personal digital assistant (PDA)-type mobile station for which synchronization with a user's desktop computer (not shown) may be desirable, but is an optional device component. Such a port 130 would enable a user to set preferences through an external device or software application and would extend the capabilities of mobile station 100 by providing for information or software downloads to mobile station 100 other than through a wireless communication network. The alternate download path may for example be used to load an encryption key onto the device through a direct and thus reliable and trusted connection to thereby enable secure device communication.

Other communications subsystems 144, such as a short-range communications subsystem, is a further optional component which may provide for communication between mobile station 100 and different systems or devices, which need not necessarily be similar devices. For example, the subsystem 144 may include an infrared device and associated circuits and components or a Bluetooth' communication module to provide for communication with similarly enabled systems and devices.

In a dual processor wireless device such as displayed in FIG. 1, with a push-to-talk capability, microprocessor 138 is typically used for controlling the push-to-talk button 134, and the other processor 111 has a radio frequency interface and a radio push-to-talk key 174 for originating or participating in a Direct Connect™ or Walkie-Talkie phone call.

Radio push-to-talk key on/off in a dual processor environment can be defined as being equivalent to user button on/off in a single processor environment where radio functionality is embedded in the single processor (FIG. 1). In a dual processor environment the radio push-to-talk key can be activated or deactivated by sending a software command from controller processor 138 to radio chip 111.

In order to ensure that the above chips are synchronized and in a stable state, the method of the present invention ensures that the state tends to stay or move into either one of two stable states:

a) The user push-to-talk button 134 is on and the radio push-to-talk key 174 is on; and b) The user push-to-talk button 134 is off and the radio push-to-talk key 174 is off.

Any other state besides the above two states is considered an unstable state by the method of the present invention and the state machine will, according to the method of the present invention, exit that state and attain one of the above two stable states.

Figure 2:
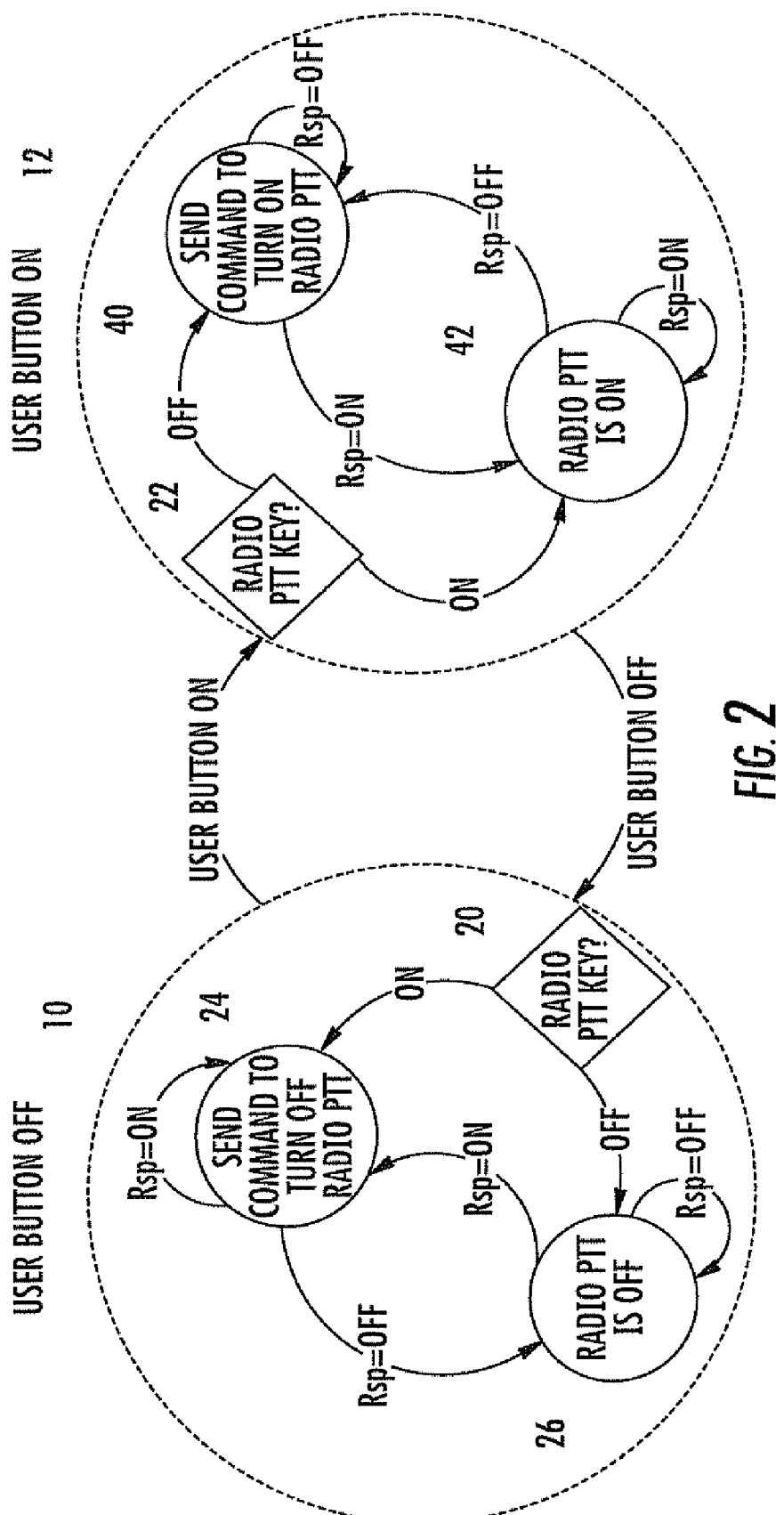
FIG. 2 is a state machine diagram showing the method of the present invention.

Reference is now made to FIG. 2. In FIG. 2, the state machine is either in a state 10 or when the user button as seen at the microprocessor 138 is off or in state 12 when the user button is on. As defined above, it is desirable that the radio push-to-talk key 174 is off if the state machine is within state 10 and the radio push-to-talk key 174 is on when the state machine is in state 12.

The above is accomplished by checking the state of the radio push-to-talk key 174 in step 20 when entering state 10 or in step 22 when entering state 12. From the inquiry in step 20, if the radio push-to-talk key 174 is on, the method of the present invention moves to step 24. In step 24, the device realizes that the radio push-to-talk key 174 should be off, and step 24 sends a command to turn off the radio push-to-talk key 174.

As a result of the request sent in step 24, step 24 can expect a response. If the response indicates that the radio push-to-talk key 174 is off, the method of the present invention next moves to state 26 in which both the user button is off and the radio push-to-talk key 174 is off.

Conversely, if step 24 receives a response that the radio push-to-talk key 174 is on, step 24 loops and again sends a command to turn off the radio push-to-talk key 174. Step 24 will continue to do this until the radio push-to-talk key 174 is turned off.

Similarly, if the user push to-talk button 134 is on, then the state machine is within state 12. A first action when the user push-to-talk button 134 turns on is to check the radio push-to-talk key 174 in step 22. If step 22 finds that the radio push-to-talk key 174 is off, the state machine moves to state 40 within state 12. In state 40, a command is sent to turn on the radio push-to-talk key 174. This is because if the user push-to-talk button 134 is on then the radio push-to-talk key 174 should also be on.

As a result of the command sent in state 40, state 40 expects a response. If this response indicates that the radio push-to-talk key is off, state 40 loops on itself and sends a command again to turn on the radio push-to-talk key. This is done until a response is received to indicate that the radio push-to-talk key is on.

Once the state machine receives a response that the radio push-to-talk key 174 is on, the state machine moves to state 42. In state 42, the radio push-to-talk key 174 is on and the user push-to-talk button 134 is on and as defined above this is considered by the state machine to be a stable state and the machine will stay in this state as long as both conditions are true.

If the machine is in state 26 or state 42, it can receive unsolicited responses which may indicate a synchronization problem. If the machine is in state 26 and it receives a response that the radio push-to-talk key 174 is off, then the state machine will remain in state 26.

Conversely, if a response is received that the radio push-to-talk key 174 is on, the state machine moves back to state 24 in which a command is sent to turn off the radio push-to-talk key 174. The state machine will stay in state 24 until a response is received that the radio push-to-talk key 174 is off and will move back to state 26.

Similarly, if the state machine is in state 42 and it receives a response that the radio push-to-talk key 174 is on, then the state machine loops on itself and will stay in state 42.

Conversely, if the state machine is in state 42 and receives a response that the radio push-to-talk key 174 is off, the state machine will move back to state 40 in which a command is sent to turn on the radio push-to-talk key 174. The state machine will stay in state 40 until a response is received that the radio push-to-talk key is on, at which time it will move back to state 42.

The action of a user to turn the user push-to-talk button 134 off when previously on will cause the state machine to move from state 12 to state 10. In this case, the state machine will move to step 20 and will proceed to state 26 as quickly as possible.

Similarly, when the user button is turned on after it has previously been off, the state machine moves from state 10 into state 12 and in step 22 a check with the radio push-to-talk key is performed to move the state machine into state 42 as quickly as possible.

The method of the present invention therefore provides a way to move the two processors into a synchronized state after a user action or after the two processors become unsynchronized. Although the present invention has been described with regards to the preferred embodiments thereof, one skilled in the art will realize that other variations are possible, and that the invention is only intended to be limited in scope by the following claims:

That which is claimed is:

1. A method for operating a wireless communication device comprising a radio chip processor and a radio push-to-talk key coupled thereto, and a microprocessor and a user push-to-talk key coupled thereto, the method comprising:
   using the microprocessor to check a status of the radio push-to-talk key relative to a status the user push-to-talk button, and
      if the user push-to-talk button is on and the radio push-to-talk key is off, sending a command to the radio chip processor to turn on the radio push-to-talk key and enter a synchronized on state,
      if the user push-to-talk button is off and the radio push-to-talk key is on, sending a command to the radio chip processor to turn off the radio push-to-talk key and enter a synchronized off state,
      if the user push-to-talk button is off and the radio push-to-talk key is off, remaining in this synchronized off state, and
      if the user push-to-talk button is on and the radio push-to-talk key is on, remaining in this synchronized on state.

2. The method according to claim 1 further comprising receiving an unsolicited message at the microprocessor indicating whether the radio push-to-talk key is on or off.

3. The method according to claim 2 further comprising if the user push-to-talk button is on and the unsolicited message indicates that the radio push-to-talk key is off, sending a command to the radio chip processor to turn on the radio push-to-talk key, and waiting for a response from the radio chip processor, and if the response indicates the radio push-to-talk key is on, remaining in this synchronized on state, otherwise repeating the sending and waiting steps.

4. The method according to claim 2 further comprising if the user push-to-talk button is off and the unsolicited message indicates that the radio push-to-talk key is on, sending a command to the radio chip processor to turn off the radio push-to-talk key, and waiting for a response from the radio chip processor, and if the response indicates the radio push-to-talk key is off, remaining in this synchronized off state, otherwise repeating the sending and waiting steps.

5. The method according to claim 2 further comprising if the user push-to-talk button is on and the unsolicited message indicates that the radio push-to-talk key is on, remaining in this synchronized on state.

6. The method according to claim 2 further comprising if the user push-to-talk button is off and the unsolicited message indicates that the radio push-to-talk key is off, remaining in this synchronized off state.

7. The method according to claim 2 further comprising repeating the checking each time the user push-to-talk button is operated.

8. A method for operating a wireless communication device comprising a radio chip processor and a radio push-to-talk key coupled thereto, and a microprocessor and a user push-to-talk key coupled thereto, the method comprising:
   using the microprocessor to check a status of the radio push-to-talk key relative to a status of the push-to-talk button and based upon each operation of the user push-to-talk button, and
      if the user push-to-talk button is on and the radio push-to-talk key is off, sending a command to the radio chip processor to turn on the radio push-to-talk key and entering a synchronized on state,
      if the user push-to-talk button is off and the radio push-to-talk key is on, sending a command to the radio chip processor to turn off the radio push-to-talk key and entering a synchronized off state,
      if the user push-to-talk button is off and the radio push-to-talk key is off, remaining in this synchronized off state, and
      if the user push-to-talk button is on and the radio push-to-talk key is on, remaining in this synchronized on state; and
   receiving an unsolicited message at the microprocessor indicating whether the radio push-to-talk key is on or off.

9. The method according to claim 8 further comprising if the user push-to-talk button is on and the unsolicited message indicates that the radio push-to-talk key is off, sending a command to the radio chip processor to turn on the radio push-to-talk key, and waiting for a response from the radio chip processor, and if the response indicates the radio pushto-talk key is on, remaining in this synchronized on state, otherwise repeating the sending and waiting steps.

10. The method according to claim 8 further comprising if the user push-to-talk button is off and the unsolicited message indicates that the radio push-to-talk key is on, sending a command to the radio chip processor to turn off the radio push-to-talk key, and waiting for a response from the radio chip processor, and if the response indicates the radio push-to-talk key is off, remaining in this synchronized off state, otherwise repeating the sending and waiting steps.

11. The method according to claim 8 further comprising if the user push-to-talk button is on and the unsolicited message indicates that the radio push-to-talk key is on, remaining in this synchronized on state.

12. The method according to claim 8 further comprising if the user push-to-talk button is off and the unsolicited message indicates that the radio push-to-talk key is off, remaining in this synchronized off state.

13. A wireless communications device comprising:
a radio chip processor and a radio push-to-talk key coupled thereto; and
a microprocessor and a user push-to-talk key coupled thereto;
said microprocessor checking a status of the radio push-to-talk key relative to a status of the user push-to-talk button, and
if the user push-to-talk button is on and the radio push-to-talk key is off, sending a command to the radio chip processor to turn on the radio push-to-talk key and entering a synchronized on state,
if the user push-to-talk button is off and the radio push-to-talk key is on, sending a command to the radio chip processor to turn off the radio push-to-talk key and entering a synchronized off state,
if the user push-to-talk button is off and the radio push-to-talk key is off, remaining in this synchronized off state, and
if the user push-to-talk button is on and the radio push-to-talk key is on, remaining in this synchronized on state.

14. The wireless communications device according to claim 13 wherein said microprocessor further receives an unsolicited message indicating whether the radio push-to-talk key is on or off.

15. The wireless communications device according to claim 14 wherein said microprocessor, if the user push-to-talk button is on and the unsolicited message indicates that the radio push-to-talk key is off, sends a command to the radio chip processor to turn on the radio push-to-talk key, and to waits for a response from the radio chip processor, and if the response indicates the radio push-to-talk key is on, remains in this synchronized on state, otherwise repeats the sending and waiting steps.

16. The wireless communications device according to claim 14 wherein said microprocessor, if the user push-to-talk button is off and the unsolicited message indicates that the radio push-to-talk key is on, sends a command to the radio chip processor to turn off the radio push-to-talk key, and to wait for a response from the radio chip processor, and if the response indicates the radio push-to-talk key is off, remains in this synchronized off state, otherwise repeats the sending and waiting steps.

17. The wireless communications device according to claim 14 wherein said microprocessor, if the user push-to-talk button is on and the unsolicited message indicates that the radio push-to-talk key is on, remains in this synchronized on state.

18. The wireless communications device according to claim 14 wherein said microprocessor, if the user push-to-talk button is off and the unsolicited message indicates that the radio push-to-talk key is off, remains in this synchronized off state.

19. The wireless communications device according to claim 13 wherein said microprocessor repeats the checking each time the user push-to-talk button changes is operated.

* * * * *

UNITED STATES PATENT AND TRADEMARK OFFICE
CERTIFICATE OF CORRECTION

PATENT NO. : 7,526,305 B2
APPLICATION NO. : 11/745935
DATED : April 28, 2009
INVENTOR(S) : Rao et al.

It is certified that error appears in the above-identified patent and that said Letters Patent is hereby corrected as shown below:

Column 5, Line 58                Delete: "status the"
                                 Insert: --status of the--

Column 8, Line 12                Delete: "and to"
Claim 15                         Insert: --and--

Column 8, Line 38                Delete: "changes"
Claim 19

Signed and Sealed this

Twenty-first Day of July, 2009

JOHN DOLL
*Acting Director of the United States Patent and Trademark Office*